(12) United States Patent
Gröppel et al.

(10) Patent No.: US 9,859,766 B2
(45) Date of Patent: Jan. 2, 2018

(54) ROTOR END-BELL FOR ELECTRIC GENERATORS

(75) Inventors: Peter Gröppel, Erlangen (DE); Steffen Lang, Hallerndorf (DE); Claus Rohr, Mannheim (DE)

(73) Assignee: SIEMENS AKTIENGESELLSCHAFT (DE)

( * ) Notice: Subject to any disclaimer, the term of this patent is extended or adjusted under 35 U.S.C. 154(b) by 381 days.

(21) Appl. No.: 14/128,276

(22) PCT Filed: Jun. 13, 2012

(86) PCT No.: PCT/EP2012/061212
§ 371 (c)(1),
(2), (4) Date: Dec. 20, 2013

(87) PCT Pub. No.: WO2012/175388
PCT Pub. Date: Dec. 27, 2012

(65) Prior Publication Data
US 2014/0125192 A1  May 8, 2014

(30) Foreign Application Priority Data
Jun. 21, 2011  (DE) .......... 10 2011 077 861

(51) Int. Cl.
*H02K 3/51* (2006.01)
*H02K 3/52* (2006.01)

(52) U.S. Cl.
CPC .......... *H02K 3/51* (2013.01); *H02K 3/527* (2013.01)

(58) Field of Classification Search
CPC ...................................................... H02K 3/51

USPC .................................................. 310/400–417
See application file for complete search history.

(56) References Cited

U.S. PATENT DOCUMENTS

| 4,091,301 A | 5/1978 | Blank |
| 4,275,324 A | 6/1981 | Flick |
| 4,908,534 A * | 3/1990 | Gubler .......... B65H 54/74 310/412 |
| 5,068,564 A | 11/1991 | Frank |
| 6,864,617 B1 | 3/2005 | Wang et al. |
| 2002/0125788 A1* | 9/2002 | Leijon .......... H01F 3/10 310/400 |
| 2006/0255678 A1* | 11/2006 | Du .......... H01R 43/10 310/156.43 |

(Continued)

FOREIGN PATENT DOCUMENTS

| CN | 1061118 A | 5/1992 |
| CN | 1588760 A | 3/2005 |
| CN | 1604427 A | 4/2005 |

(Continued)

OTHER PUBLICATIONS

International Search Report and Written Opinion dated Jun. 18, 2013 issued in corresponding international patent application No. PCT/EP2012/061212.

(Continued)

*Primary Examiner* — Terrance Kenerly
(74) *Attorney, Agent, or Firm* — Ostrolenk Faber LLP

(57) ABSTRACT

A rotor end-bell (2) for an electric generator, the rotor end-bell (2) being made at least in part of fiber-reinforced plastic. A rotor (1) and an electric generator (T) have at least one such rotor end-bell (2). The end-bell can be advantageously used in high-speed turbo generators.

20 Claims, 1 Drawing Sheet

(56) References Cited

U.S. PATENT DOCUMENTS

2012/0255879 A1* 10/2012 Gillespie ............ A63B 71/0036
206/216

FOREIGN PATENT DOCUMENTS

| | | |
|---|---|---|
| DE | 1 132 647 | 7/1962 |
| DE | 26 29 574 | 1/1977 |
| DE | 41 39 333 A1 | 6/1993 |
| EP | 0 025 292 | 3/1981 |
| EP | 0 484 026 A2 | 5/1992 |
| EP | 0 545 210 | 6/1993 |
| EP | 1 628 382 B1 | 2/2006 |
| FR | 2 860 657 | 4/2005 |
| GB | 1 281 348 | 7/1972 |
| GB | 1 549 202 | 8/1979 |
| JP | 56-038972 | 4/1981 |
| JP | S63-124741 | 5/1988 |
| JP | 2005-064664 A | 3/2005 |
| JP | 2005-117890 A | 4/2005 |
| JP | 4334940 B2 | 9/2009 |
| RU | 41203 U1 | 10/2004 |
| SU | 1224908 A | 4/1986 |
| SU | 1257757 A1 | 9/1986 |

OTHER PUBLICATIONS

German Search Report dated Apr. 30, 2012 issued in corresponding German patent application No. 10 2011 077 861.6.

First Office Action dated Jun. 2, 2015 in corresponding Chinese Patent Application No. 201280030573.8 and Search Report with English language translation (24 pages).

Japanese Office Action mailed Mar. 7, 2016 in corresponding Japanese Patent Application No. 2014-516274.

Russian Office Action mailed Nov. 12, 2015 in corresponding Russian Patent Application No. 2014101617.

Wikipedia, "Bajonettverschluss," pp. 1-3; Jan. 2011, url address: http://de.wikipedia.org/w/index.php?title=Bajonettverschluss&oldid=84412049.

Wikipedia, the free encyclopedia, "Bayonet mount," pp. 1-5, retrieved from the Internet on Aug. 16, 2016, url address: https://en.wikipedia.org/wiki/Bayonet_mount.

International Search Report dated Jun. 18, 2013 in corresponding PCT International Application No. PCT/EP2012/061212.

Dr. Flemming et al., "Faserverbundbauweisen," Dec. 31, 1995, Springer Verlag, Berlin / Heidelberg, XP002691572, ISBN: 3-540-58645-8, pages 32, 119-122, along with an English summary thereof, (see also International Search Report for relevance).

* cited by examiner

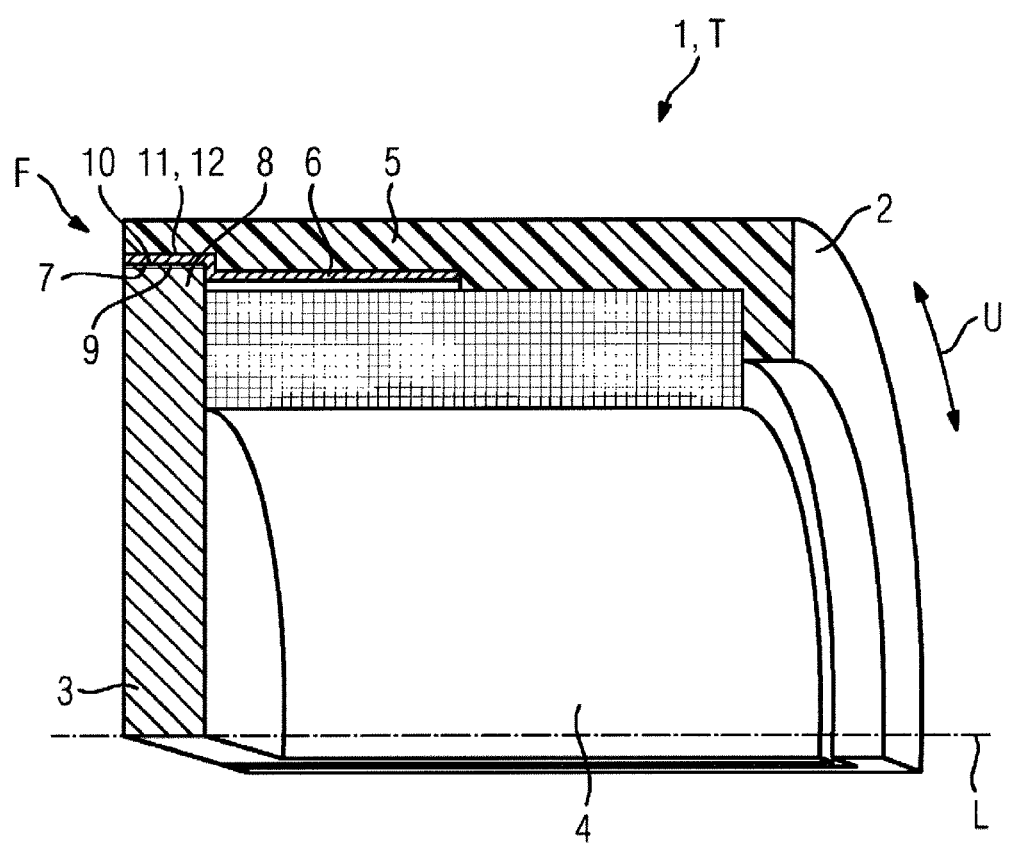

ROTOR END-BELL FOR ELECTRIC GENERATORS

CROSS-REFERENCE TO RELATED APPLICATIONS

The present application is a 35 U.S.C. §§371 national phase conversion of PCT/EP2012/061212, filed Jun. 13, 2012, which claims priority of German Patent Application No. 102011077861.6, filed Jun. 21, 2011, the contents of which are incorporated by reference herein. The PCT International Application was published in the German language.

TECHNICAL FIELD

The invention relates to a rotor end-bell for an electric generator. The invention also relates to a rotor with such a rotor end-bell. The invention furthermore relates to such a generator. The invention is advantageously usable in particular in high-speed turbo generators.

BACKGROUND OF THE INVENTION

EP 1 628 382 B1 discloses a rotor for a generator, in particular a high power turbo generator. The rotor has grooves which run axially in a rotor body and have inserted conductor bars which are radially supported in the grooves by means of keys. At the ends of the rotor body, the conductor bars are in each case electrically connected to one another in a rotor end winding. The rotor end windings are in each case covered by a rotor end-bell pushed over the end of the rotor body. An electrically insulating covering channel is arranged in the grooves in each case between the uppermost conductor bar and the key. The covering channel is adjoined, outside the rotor body, by end-bell insulation arranged between the rotor end winding and the rotor end-bell. Furthermore, the covering channels are designed with axially stepped ends at the ends of the rotor body such that the end-bell insulation comprises a ring or a plurality of end-bell insulation segments which are designed toward the rotor body in such a manner that said end-bell insulation segments fit onto the axially stepped ends of the covering channels, and that the rotor end-bell is pushed directly over the end-bell insulation. The rotor end-bell is typically comprised of a high-alloy steel, for example the nitrogen-alloyed special steel P900 from Energietechnik Essen with the material number/DIN code: 1.3816, ASTM A 289, class C.

The development of ever larger turbo generators requires a rotor end-bell of particularly high strength, sufficient shaping properties, an option for non-magnetizability, corrosion resistance and a low weight. There has hitherto been the disadvantage that the forging and finishing of rotor end-bells is very time-consuming, and the high-alloy steels used have high material and manufacturing costs. In addition, because of the restricted availability of the special steels used for the rotor end-bells, delivery bottlenecks may occur at times.

SUMMARY OF THE INVENTION

It is the object of the present invention to provide a rotor end-bell for an electric generator, which at least partially overcomes the disadvantages of the prior art.

The object is achieved by a rotor end-bell for an electric generator, wherein the rotor end-bell is at least partially comprised of fiber reinforced plastic.

Said rotor end-bell has the advantage that it at least partially has (namely at the location where it has the fiber reinforced plastic) a significantly lower density (for example from approx. 1.5 to 1.6 g/cm$^3$) than high-alloy steel (approx. 7.8 g/cm$^3$) and therefore a considerably lower weight. It is thus possible significantly to be able to reduce intrinsic centrifugal forces of the rotor end-bell which, at typical overspeeds of approx. 3000 to 3600 rpm, make up to 50% of the resulting stresses in the rotor end-bell. In addition, the fiber reinforced plastic has a significantly higher specific strength, in particular tensile strength, and a significantly higher specific modulus of elasticity. As a result, for example, a wall thickness can be reduced, which reduces the weight even further. Furthermore, fiber reinforced plastic has a negative coefficient of thermal expansion, and therefore the rotor end-bell is pulled tight onto the rotor at an elevated temperature. As a result, during operation, a rotor end-bell expansion produced by the centrifugal force can be significantly suppressed by the thermal shrinkage, which assists in providing a secure seat for the rotor end-bell. By contrast, in the case of the current steel rotor end-bell, the rotor end-bell additionally expands as the temperature rises. Fiber reinforced plastic is also intensely corrosion resistant. Yet another advantage resides in the fact that fiber reinforced plastic is not magnetic as standard. Nevertheless, desired electrical damping properties can arise if the fibers are electrically conductive. The rotor end-bell can be formed in a flexible and versatile manner by the use of the fiber reinforced plastic. Production costs and production times can likewise be significantly reduced, since a complex forging process and finishing process are dispensed with. In addition, material costs can be significantly reduced when a high-alloy steel is substituted by the fiber reinforced plastic. Fiber reinforced plastic is sufficiently and easily available.

The fiber reinforced plastic may also be referred to as a plastics matrix/fiber composite material.

In one refinement, the fibers have at least one preferred direction. Particularly high strength can thus be achieved in the direction of particularly high stresses, which reduces the probability of failure occurring, for example due to cracking, and increases the service life.

In one refinement, the at least one preferred direction, in particular, at least substantially comprises a circumferential direction of the rotor end-bell. In particular mechanical stresses, in particular tensile stresses which are based on a circumferential expansion caused by centrifugal forces, can be taken into consideration. A circumferential direction can be understood as meaning in particular a direction of a changing azimuth angle with respect to an axis of rotation or longitudinal axis of the rotor end-bell.

In one development, the at least one preferred direction comprises precisely one preferred direction, the fibers are thus at least locally oriented unidirectionally. Particularly high strength can thereby be achieved in said preferred direction.

The fibers can be present or can have been supplied in particular as (loose) unidirectional fibers, as woven fiber fabric and/or as laid fiber fabric.

In another refinement, the fibers have or are carbon fibers. Carbon fibers have the advantage that they make possible high-strength matrix-fiber composite materials, are inexpensive, are widely available, can be handled in a simple manner during production and, in addition, are electrically conductive.

In yet another refinement, the fibers have ceramic fibers. Ceramic fibers have the advantage of particularly high tensile strength and expandability and also high temperature resistance.

The ceramic fibers can be, in particular, oxidic ceramic fibers, in particular aluminum oxide fibers or silicon dioxide fibers. Alternatively or in addition, the ceramic fibers can be non-oxidic ceramic fibers, in particular silicon carbide fibers.

In yet another refinement, the fibers have boron fibers. The latter have extremely high strength and rigidity.

In another development, the fibers have aramid fibers. Aramid fibers are distinguished by very high strength, high impact toughness, high failure strain, good vibration damping and high resistance to acids and alkaline solutions. Furthermore, they are highly heat and fire resistant.

Furthermore, in one refinement, the fibers are embedded in a plastics matrix comprised of resin, in particular epoxy resin. Epoxy resin is well known and controllable as a matrix material for fibers. Epoxy resin is furthermore of high strength and is chemically stable. However, other plastics, in particular thermosetting plastics, are also usable.

The rotor end-bell can be produced with regard to the fiber reinforced plastic thereof, for example, by means of filament winding, by means of transfer molding (also called "resin transfer molding"; RTM) and/or by means of prepreg technology. These production methods enable flexible and efficient production of components.

In another refinement, the rotor end-bell is entirely produced from the fiber reinforced plastic.

In another refinement, the inner side of the rotor end-bell has a spacer ring ("inlay") which is provided as a support surface. A material of the spacer ring has, in particular, a lower electrical resistance than the fiber reinforced plastic. This makes it possible to prevent high currents flowing in the rotor end-bell in the event of an unbalanced load of the rotor from leading to excessively high temperatures in the rotor end-bell.

The rotor end-bell is therefore fastened to the rotor in such a manner that the fiber reinforced plastic rests on the rotor at least partially via the spacer ring. In particular, the spacer ring is provided to rest on rotor teeth of the rotor. The inner side of the spacer ring is therefore exposed while the outer side makes contact with the fiber reinforced plastic.

In one development, the spacer ring is comprised of metal. This makes it possible to supply a metal spacer ring which is particularly inexpensive and is readily electrically conductive, in particular since exacting mechanical requirements do not need to be imposed on the metal. At the same time, because of the use of the spacer ring, improvements arise in respect of the mechanical properties of the rotor end-bell and in respect of simplification in use.

In a special refinement, the spacer ring is comprised of steel having a low alloying contribution. Said spacer ring is particularly inexpensive and has a sufficiently low specific electrical resistance.

In one special refinement, the spacer ring is comprised of copper or of an alloy therewith. Copper has a particularly low specific electrical resistance.

In another refinement, the spacer ring is provided at least on its outer side, which bears against the fiber reinforced plastic, with an intensely electrically conductive layer, in particular comprised of silver. Electrical contact between the rotor and the spacer ring of the rotor end-bell can thus be improved. As a result, in turn, the damping properties of the rotor end-bell can be particularly effectively set.

In an advantageous refinement for simple and secure installation of the rotor end-bell, the inner side of the spacer ring (i.e. in particular in the surface of the spacer ring supporting the rotor) has a thread (i.e. a thread in the narrower meaning or a thread pitch). As a result, the rotor end-bell can simply be screwed on.

In an advantageous refinement for simple fastening of the rotor end-bell even in the case of a tight fit of the thread, the thread is a conical thread.

In addition or alternatively, the rotor end-bell can be designed for producing a quarter turn connection.

Alternatively to the inner spacer ring, it is possible, for example, for an outer spacer ring to be used. The fiber reinforced plastic may also have, for example, thin metal wires or the like.

The object is also achieved by a rotor for an electric generator, in particular turbo generator, with at least one rotor end-bell as described above. The rotor has the same advantages as the rotor end-bell and can be designed analogously.

In an advantageous refinement for the case in which the inner side of the spacer ring has a thread, a mating thread matching the thread of the spacer ring is located on support surfaces of rotor teeth of the rotor. Said mating thread (thread pitch or thread) can be produced, for example, by a material-abrading method or by adhesively bonding, screwing, welding or soldering thread guides onto the support surfaces of the rotor teeth.

In one development, the rotor end-bell is fastenable to the rotor by means of an additional or alternative fixing in the form of a second screw connection (in particular lock nut).

In addition, the rotor can be designed for producing a quarter turn connection with the rotor end-bell.

In another refinement, the rotor end-bell, for the installation thereof on the rotor, has first of all been cooled and subsequently shrunk onto the rotor. Use is made here of the fact that fiber reinforced plastic has a negative coefficient of thermal expansion at least in the fiber direction, i.e. expands as the temperature drops. Consequently, in particular a rotor end-bell, in which the fibers are oriented substantially in the circumferential direction, will expand in a suitable manner. In the cooled state, the rotor end-bell, which is comprised of the fiber reinforced plastic, or the main body thereof can be pushed onto the rotor (and optionally onto the spacer ring). Subsequent heating causes the rotor end-bell or the main body thereof to be shrunk onto the rotor. This method may also be considered to be independently inventive.

The object is also achieved by an electric generator, in particular turbo generator, with at least one rotor or with at least one rotor end-bell as described above. The generator has the same advantages as the rotor end-bell and the rotor and can be designed analogously.

BRIEF DESCRIPTION OF THE DRAWING

The above-described properties, features and advantages of this invention and also the manner in which these are achieved will become clearer and more plainly comprehensible in conjunction with the following schematic description of an exemplary embodiment explained in more detail in conjunction with the drawing accompanying this specification, in which FIG. 1 is a schematic depiction of an embodiment of a rotor with a rotor end-bell including the subject of this disclosure.

FIG. 1 shows, in an oblique view, part of a rotor 1 of a turbo generator T in a quarter sector section about a longitudinal axis L in the region of a rotor end-bell 2. The rotor end-bell 2 sits in the region of the end side F thereof on one end of a rotor body 3 and surrounds an end winding 4 in the manner of a jacket.

The rotor end-bell 2 is comprised of a main body 5 made of fiber reinforced plastic and a metal spacer ring 6 arranged on the end side F thereof. The spacer ring 6 consequently has a lower specific electrical resistance than the main body 5 made of the fiber reinforced plastic.

The fiber reinforced plastic of the main body 5 is a carbon fiber reinforced epoxy resin, i.e. a composite material with carbon fibers arranged in an epoxy matrix. The carbon fibers are oriented substantially unidirectionally, namely here substantially along a circumferential direction U of the rotor end-bell 2, as indicated by the double-sided arrow.

An inner side 7 of the spacer ring 6 (for example comprised of low-alloy steel or of copper) serves as a support surface on the rotor (apart from the rotor end-bell 2), specifically typically on rotor teeth 8 of the rotor 1. The spacer ring 6 can be coated, for example, during the production of the main body 5, with the carbon fiber reinforced plastic or can be wound therewith. The inner side 7 of said spacer ring 6 has a thread 9 which is in engagement with a mating thread 10 located on the support surfaces of the rotor teeth 8. For simple fastening, the thread 9 and the mating thread 10 are of conical design.

For an improved electrical transition between spacer ring 6 and the main body 5, the spacer ring 6 is provided on its outer side 11, which bears against the main body 5, with a silver layer 12.

The inner side of the main body is designed with a double-step in order to provide a stop for the precise positioning of the spacer ring 6. The spacer ring 6 is designed with a single-step in order to enable precise bearing against the rotor body 3.

Although the invention has been illustrated and described in more detail by means of the exemplary embodiment shown, the invention is not limited thereto, and other variations can also be deduced therefrom by a person skilled in the art without departing from the scope of protection of the invention.

The invention claimed is:

1. A rotor end-bell configured for placement on an end of a rotor of an electric generator, wherein the rotor end-bell is at least partially comprised of fiber reinforced plastic, a portion of the rotor end-bell comprising fiber reinforced plastic being configured to surround and directly contact an end winding of the rotor, the portion of the rotor end-bell, which comprises fiber reinforced plastic, being configured to contact a portion of the radial thickness of the end winding of the rotor at an end of the end winding of the rotor,
wherein the rotor end-bell has a radially inner side, a spacer ring is configured and located to define a support surface between the rotor end-bell and a support for the rotor end-bell, the spacer ring has a single step to allow an outer side of the spacer ring to bear against an inner side of the portion of the rotor end-bell comprising fiber reinforced plastic, the single step of the spacer ring bearing against a double step of the inner side of the portion of the rotor end-bell comprising fiber reinforced plastic.

2. The rotor end-bell as claimed in claim 1, wherein the plastic includes fibers that have at least one preferred direction in the end-bell which at least substantially comprises a circumferential direction of the rotor end-bell.

3. The rotor end-bell as claimed in claim 1, wherein the plastic includes fibers and the fibers include carbon fibers.

4. The rotor end-bell as claimed in claim 1, wherein the plastic includes fibers and the fibers include ceramic fibers.

5. The rotor end-bell as claimed in claim 4, wherein the ceramic fibers are aluminum oxide fibers.

6. The rotor end-bell as claimed in claim 1, wherein the plastic includes fibers and the fibers include boron fibers.

7. The rotor end-bell as claimed in claim 1, wherein the plastic includes fibers that are embedded in a matrix comprising a resin.

8. The rotor-end bell as claimed in claim 7, wherein the matrix comprises epoxy resin.

9. The rotor end-bell as claimed in claim 1, wherein the spacer ring has a lower specific electrical resistance than the fiber reinforced plastic material of which the rotor end-bell is comprised.

10. The rotor end-bell as claimed in claim 9, wherein the inner side of the spacer ring has a thread.

11. The rotor-end bell as claimed in claim 10, wherein the thread is a conical thread.

12. The rotor end-bell as claimed in claim 9, wherein the spacer ring is comprised of copper or of steel having a low alloying contribution.

13. The rotor end-bell as claimed in claim 1, wherein the rotor end-bell is configured for producing a quarter turn connection around the end of the rotor of the electric generator on which the rotor end-bell is placed.

14. A rotor for an electric generator having at least one rotor end-bell as claimed in claim 1 disposed on the end of the rotor.

15. The rotor as claimed in claim 14, wherein the rotor end-bell has been installed on the end of the rotor by the end-bell being previously cooled and subsequently shrunk onto the end of the rotor.

16. An electric generator with at least one rotor as claimed in claim 14.

17. The electric generator of claim 16, wherein the electric generator is a turbo generator.

18. A rotor end-bell configured for placement on an end of a rotor of an electric generator, wherein
the rotor end-bell is at least partially comprised of fiber reinforced plastic;
the rotor end-bell has a radially inner side, a spacer ring configured and located to define a support surface between the rotor end-bell and a support for the end-bell,
the spacer ring has a lower specific electrical resistance than the fiber reinforced plastic material of which the rotor end-bell is comprised; and
the spacer ring has an outer side, which bears against the fiber reinforced plastic of the rotor end-bell, and an intensely conductive layer between the outer side of the spacer ring and the rotor end-bell.

19. The rotor-end bell as claimed in claim 18, wherein the intensely conductive layer is silver.

20. A rotor of an electric generator including a rotor end-bell, the rotor end-bell being configured for placement on an end of the rotor, wherein
the rotor end-bell is at least partially comprised of fiber reinforced plastic;
the rotor end-bell has a radially inner side, a spacer ring configured and located to define a support surface between the rotor end-bell and a support for the end-bell,
the spacer ring has a lower specific electrical resistance than the fiber reinforced plastic material of which the rotor end-bell is comprised;
the inner side of the spacer ring has a thread; and a mating thread, matching the thread of the spacer ring, is located on support surfaces of teeth of the rotor.

* * * * *